United States Patent [19]

Rudiger et al.

[11] Patent Number: 4,765,690

[45] Date of Patent: Aug. 23, 1988

[54] ELECTROMAGNETICALLY ACTUATABLE PRESSURE MODULATOR

[75] Inventors: Eckhart Rudiger; Ulrich Stein, both of Ebern, Fed. Rep. of Germany

[73] Assignee: FAG Kugelfischer Georg Schafer (KGaA), Fed. Rep. of Germany

[21] Appl. No.: 22,797

[22] Filed: Mar. 6, 1987

[30] Foreign Application Priority Data

Mar. 14, 1986 [DE] Fed. Rep. of Germany ....... 3608567

[51] Int. Cl.$^4$ .............................................. B60T 8/42
[52] U.S. Cl. .................................... 303/115; 303/9.75
[58] Field of Search .................. 188/181 A; 303/6 R, 303/22 R, 56, 113, 115

[56] References Cited

U.S. PATENT DOCUMENTS 4,358,163  11/1982  Young .................................... 303/15
4,436,348   3/1984  Farr ..................................... 303/119

Primary Examiner—Duane A. Reger
Attorney, Agent, or Firm—Ostrolenk, Faber, Gerb & Soffen

[57] ABSTRACT

An electromagnetically actuatable pressure modulator in which a lever mechanism provides a transmission ratio which varies over the stroke of the pressure relief piston, so as to minimize the lateral forces acting on the pressure relief piston and its guides, in both the pressure relief phase and the reloading phase of pressure modulation.

9 Claims, 3 Drawing Sheets

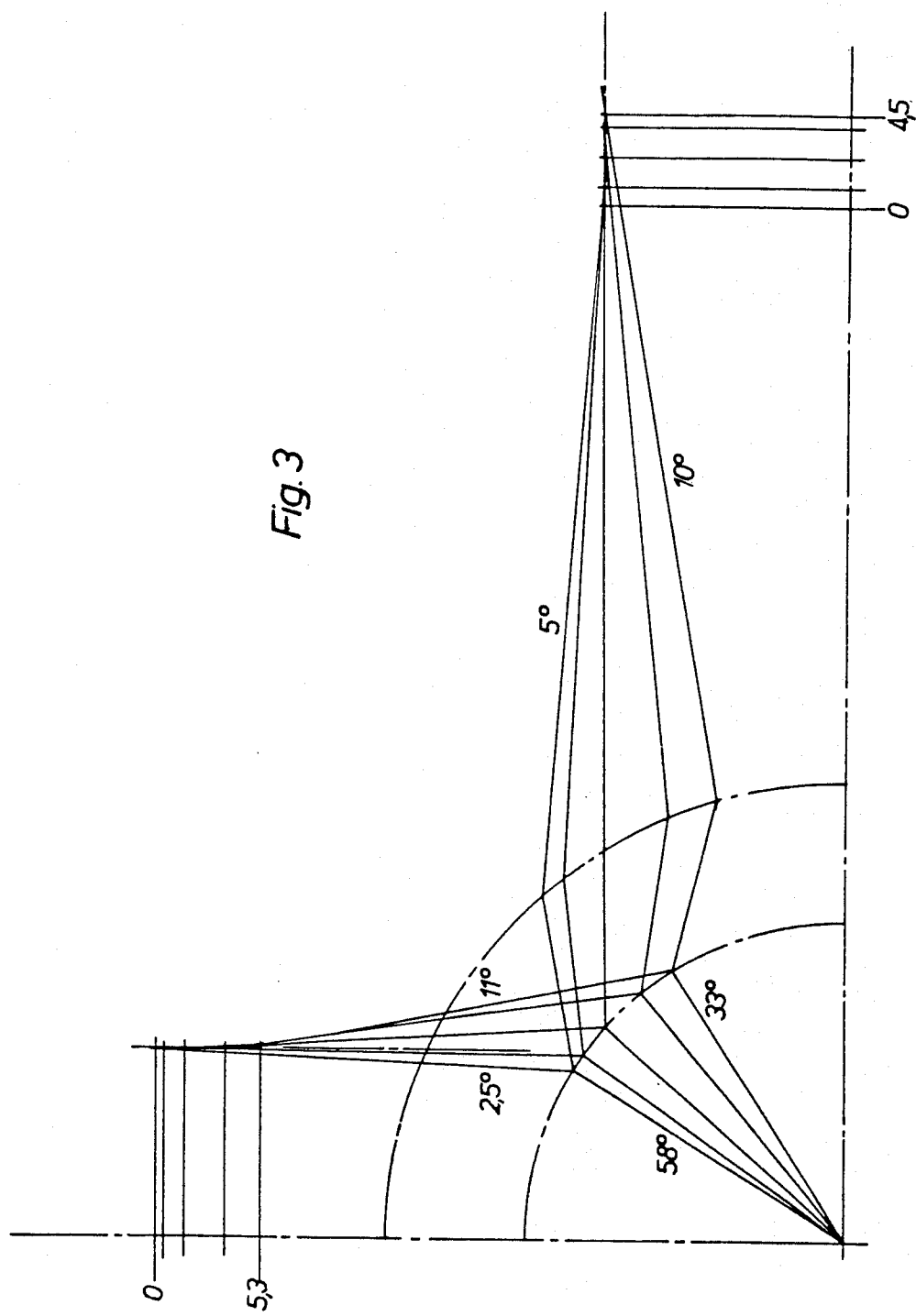

ELECTROMAGNETICALLY ACTUATABLE PRESSURE MODULATOR

BACKGROUND OF THE INVENTION

1. Field of the Invention

The present invention relates to an electromagnetically actuatable pressure modulator for anti-locking brake systems of automotive vehicles.

2. Description of Related Art

Commonly assigned U.S. patent application Ser. No. 899,201, filed Aug. 21, 1986, allowed discloses a pressure modulator which detects a threat of overbraking of an automotive vehicle wheel, and reduces the brake pressure in the wheel brake cylinder to allow the braked wheel to accelerate again. The disclosures of Ser. No. 899,201 are incorporated herein by reference.

Related developments are disclosed in commonly assigned U.S. Pat. No. 4,511,971; U.S. patent applications Ser. No. 899,212, now U.S. Pat. No. 4,691,813 issued Sept. 8, 1987, and Ser. No. 899,208, now U.S. Pat. No. 4,717,211 issued Jan. 5, 1988, both filed Aug. 21, 1986; and U.S. patent application Ser. No. 22,738, filed Mar. 6, 1987, of even date herewith. These disclosures are also incorporated herein by reference.

The pressure modulator according to Ser. No. 899,201 has a transmission for transmitting forces with a variable step-up ratio between the pressure relief piston, on the one hand, and, on the other hand, the magnet armature and/or compression spring which bias the pressure relief piston. The transmission is so developed that a linear force on the pressure relief piston results from the difference between the non-linear armature force and the non-linear spring force.

SUMMARY OF THE INVENTION

The primary object of the invention is to improve the pressure modulator disclosed in Ser. No. 899,201, so as to reduce the lateral forces on the piston and its guides, which occur both in the relief phase and in the reloading phase of pressure modulation.

This object is achieved by providing a transmission with a variable transmission ratio, comprising a lever mechanism which includes at least three transmission members, one of these being a lever which is turnably mounted in the housing and is operatively connected to two tappets which, in turn, are operatively connected to the pressure relief piston and the electromagnet armature, respectively.

According to an advantageous aspect of the invention, a pressure modulator comprises inlet means for receiving hydraulic pressure from a master cylinder, outlet means for transmitting pressure to a brake, and control means for communicating pressure between the inlet means and the outlet means. The control means includes an expandable chamber having a valve for controlling fluid flow between the chamber and the inlet means, the chamber being partially defined by a movable section thereof, while the outlet means communicates with the chamber independently of the valve. First biasing means urges the valve in a closing direction, while second biasing means urges the movable section in a first direction to reduce the volume of the chamber. The movable section also engages the valve, so that the second biasing means also biases the valve in an opening direction opposite to the closing direction. Actuating means are provided for selectively exerting an actuating force for opposing the second biasing means; and transmission means are also provided for transmitting forces between the actuating means, the movable section, and the second biasing means. The transmission means includes lever means providing a transmission ratio which varies as a function of the movement of the movable section.

Preferably, the lever means interconnects the movable section and the actuating means, while the second biasing means exerts a force on a remote portion of the actuating means.

The development herein has the advantage that the lever mechanism is an easily constructed transmission mechanism which can be manufactured economically, while the transmission ratio or stroke ratio can be easily adapted to any individual application by the extremely great range of geometrical variations that are possible. At the same time, the lever mechanism takes up only a small amount of space and can be easily installed.

BRIEF DESCRIPTION OF THE DRAWINGS

Other objects, features and advantages of the invention will be seen in the following description of an embodiment thereof, with reference to the drawings, in which:

FIG. 3 is a diagram illustrating the kinematics of the lever mechanism between the initial and ending positions of the pressure relief piston.

DETAILED DESCRIPTION OF THE ILLUSTRATED EMBODIMENT

Figure 1:
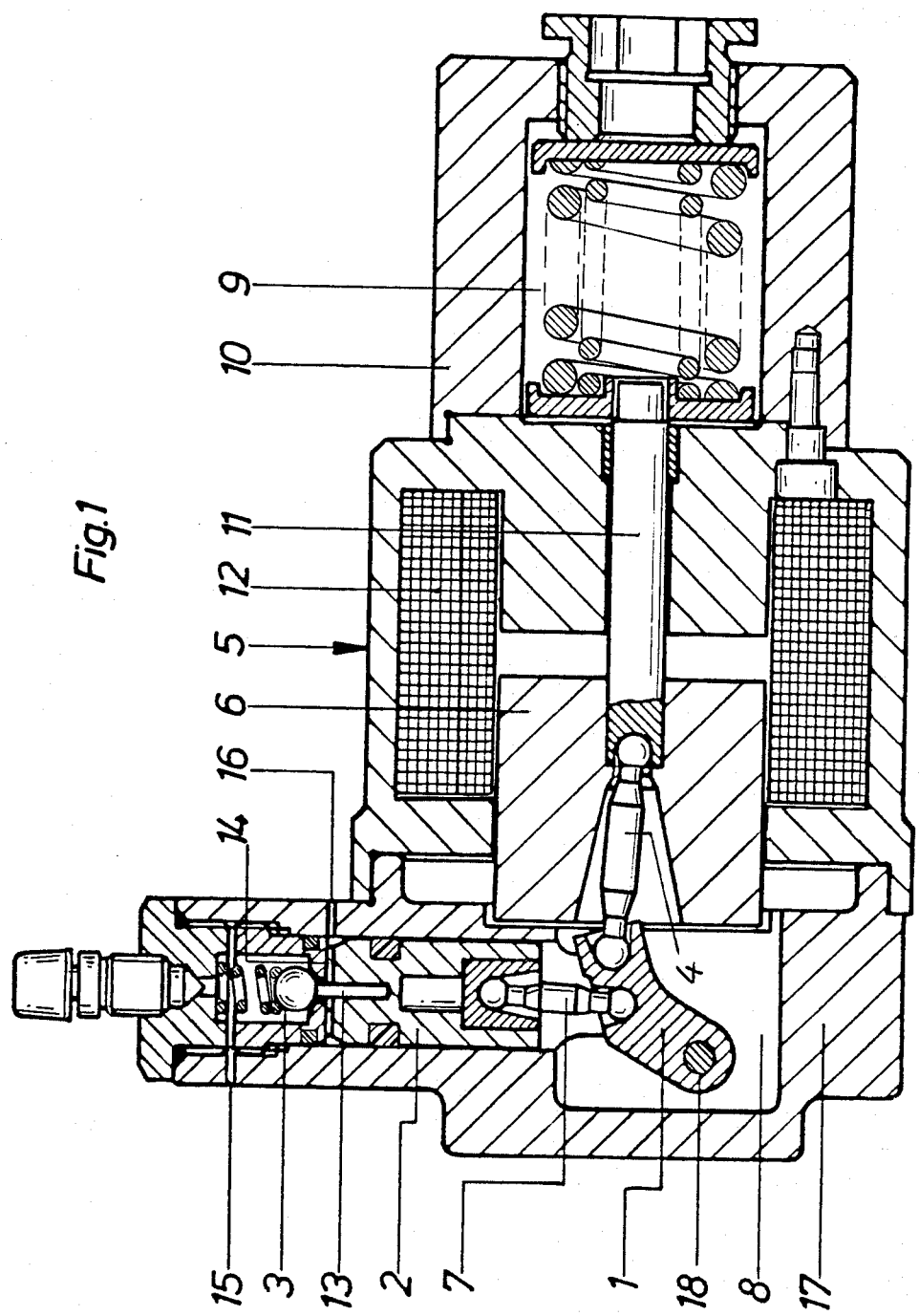
FIG. 1 is a longitudinal cross-section through a pressure modulator in its basic operating position.

FIG. 1 is a longitudinal cross-section through a pressure modulator, which includes a pressure relief piston 2; a spherical-seat valve 3; an electromagnet 5 having an armature 6 and a coil 12; and a variable transmission which includes a lever mechanism 8 and a compression spring 9. In the basic position shown in FIG. 1, the compression spring 9 holds the pressure relief piston 2 in its initial position, via the tappet 11, the armature 6 and the lever mechanism 8.

A tappet 13 arranged on the pressure relief piston 2 holds the spherical-seat valve 3 open. In this position, the master-cylinder connection 15 is directly connected to the wheel-cylinder connection 16, via the pressure space 14 which is defined between the valve 3 and the pressure relief piston 2.

The stroke of the pressure relief piston 2 is measured by a position-measuring system (not shown) which is connected to a desired-value/actual-value comparator (also not shown), which compares a measured stroke signal with a desired signal pre-established by the anti-locking device, and controls the coil 12 of the electromagnet 5 accordingly.

The initial tensioning force of the compression spring 9 is so selected that the pressure relief piston 2 is held in the initial position as long as the brake pressure which has built up in the master cylinder (not shown) and, via the pressure space 14, the wheel cylinder (also not shown), is less than a pressure which will definitely lead to the locking of the wheel. It follows that the braking pressure built up in the master cylinder will be conducted directly to the wheel brake cylinder as long as said pressure is below the locking pressure of the wheel.

The operational principles of the abovedescribed components and controls are generally similar to those disclosed in Ser. No. 899,201.

The manner of operation of the pressure modulator will now be described with respect to two cases: uncontrolled braking, in which the brake pressure is transmitted directly from the master cylinder to the wheel cylinder; and controlled braking, in which the master cylinder is disconnected and the wheel cylinder pressure is controlled by movement of the pressure relief piston 2.

Uncontrolled Braking

As long as the product of the brake pressure and the active surface area of the pressure relief piston is less than the initial force exerted on the piston 2 by the spring 9, taking the transmission ratio of the lever mechanism 8 into consideration, the valve 3 is held open and the brake pressure from the master cylinder is transmitted directly to the wheel cylinder.

However, when the pressure which comes from the master cylinder via the connection 15 and acts on the pressure relief space 14 exceeds a given amount—for instance 72 bar—the pressure relief piston 2 is pushed in the direction toward its lower end position against the pretensioning force of the compression spring 9. The tappet 13 comes out of engagement with the valve 3 and the master-cylinder connection 15 is disconnected from the wheel-cylinder connection 16.

Then, after the pressure from the master cylinder is relieved, the pressure relief piston 2 is again pushed upward into its basic position by the compression spring 9 and the tappet 13 opens the valve 3.

It follows that even upon panic braking, when pressures of up to 150 bar can readily be reached in the master cylinder, only the 72 bar, for example, passed by the valve 3 will be present at the wheel cylinder, which leads to substantial relief of mechanical stresses on the further structural parts.

Controlled Braking

In controlled braking, the anti-locking device recognizes that the braking pressure present at the wheel cylinder is causing the wheel (not shown) to lock.

To reduce the pressure, current is fed to the coil 12 of the electromagnet 5, and the armature 6 is attracted thereby so as to resist the force of the compression spring 9.

For this purpose, it is important that the electromagnet 5 be selected such that its available force is, in principle, greater in amount than the characteristic curve of the compression spring 9, for each given displacement of the armature 6, and, via the tappet 11, corresponding compression of the spring 9.

At the moment that the armature is attracted, the pressure relief piston 2 is displaced in the direction toward its lower end position by the force of the pressure acting on it in the pressure relief space 14. At this point, the tappet 13 comes out of engagement with the spherical-seat valve 3, and the master-cylinder connection 15 is thereby disconnected from the pressure relief space 14 and thus from the wheel-cylinder connection 16.

With increasing enlargement of the pressure space 14, the effective brake pressure in the wheel cylinder decreases and, via the stroke-measuring system (not shown), the actual value of the change in volume is compared with the desired value of the reduction in pressure and the coil 12 is excited accordingly.

If the wheel drops below a given deceleration threshold, for example 10 m/s$_2$, whereby the braked wheel is again accelerated, the anti-locking device generates a signal to again increase the brake pressure. The energizing of the coil 12 is reduced, whereby the compression spring 9 pushes the armature 6, and thus the pressure relief piston 2, in the direction of its initial position. By the reduction in the pressure space 14, the brake pressure in the wheel cylinder increases.

Figure 4:
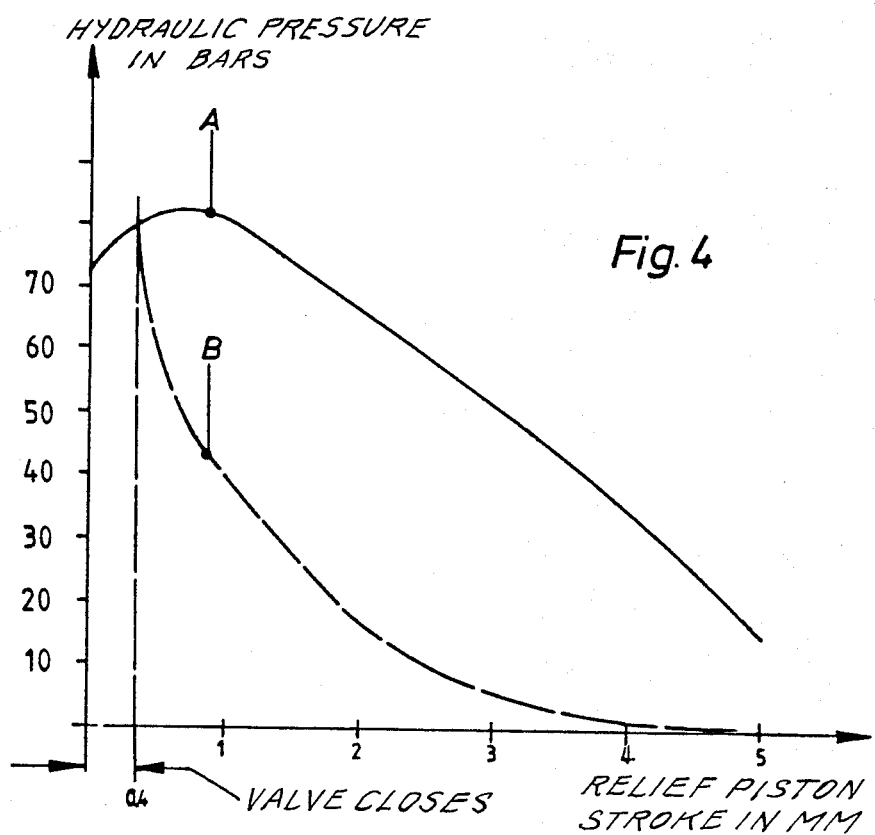
FIG. 4 is a diagram illustrating the reloading curve of the pressure relief piston (curve A) and the volume reception capacity of the wheel cylinder (curve B).

It is important in this connection that the transmission ratio (initially a step-up ratio) of the lever mechanism 8 be adapted to both the variation of the spring force as a function of spring deflection; and to the variation of the fluid volume reception capacity of the wheel cylinder (curve B in FIG. 4), which determines the minimum necessary variation of force on the pressure relief piston 2 over its stroke; such that the reloading characteristic curve A of FIG. 4 is obtained for the pressure relief piston 2.

In this connection, the actual value of the change in volume is compared with the desired value of the increase in brake pressure and the coil 12 is energized accordingly. When the maximum permissible deceleration threshold, for example 12 m/s$_2$, is again reached, another control cycle starts.

The continuous increase and decrease of the pressure takes place either until the vehicle has come to a standstill or until the pressure acting via the master cylinder connection 15 on the valve 3 is less than the pressure in the pressure space 14.

In order to be able to act on the piston 2 with a force which corresponds to the characteristic curve A of FIG. 4 during the reloading phase, the lever mechanism 8 is developed such that initially the relief piston force referred to the spring 9 is stepped up, while after a certain amount of piston travel the transmission ratio changes to a force step-down. This is obtained by the configuration of the lever 1, which is pivoted in the housing 17 on a lug 18; and the spatial positions with respect to each other of the pivot points of the transmission members 4 and 7, which are tappets which engage the piston 2 and the armature 6, respectively, and also the lever 1.

Any lateral forces which occur thereby are conducted via the lever 1 into the housing 17, and away from the piston 2 and its guide surfaces.

Figure 2:
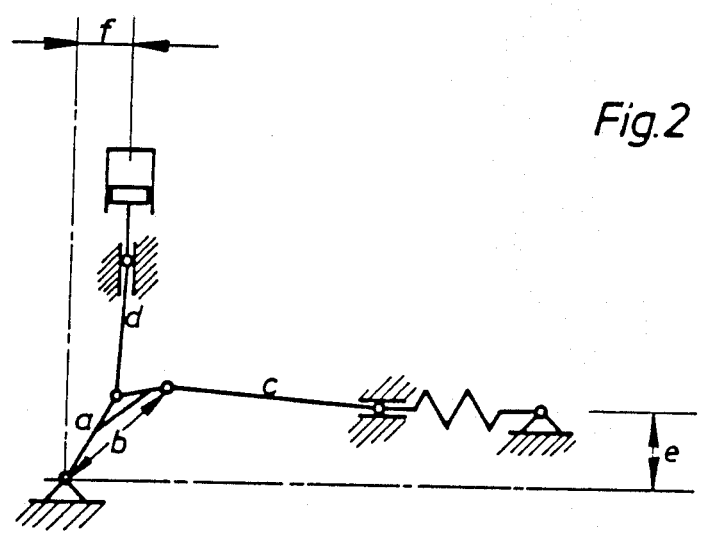
FIG. 2 is a schematic diagram showing the lever mechanism in its basic position.

The following description refers to FIGS. 2 to 4.

In the embodiment of the lever mechanism given by way of example in FIG. 2, the lengths of the transmission members 1, 7 and 4, respectively, are selected as follows:

a=16 mm; d=21 mm; o=34 mm; and the measurements resulting therefrom are:

b=23 mm; e=12.3 mm; f=9.4 mm.

The volume-receiving capacity of the brake circuit is shown qualitatively as curve B in FIG. 4, from which the minimum required reloading force on the pressure relief piston 2 is derived. The curve A represents the maximum reloading capacity of the compression spring 9, which is referred to the pressure relief piston 2, and results both from the hydraulic pressure force on the pressure relief piston 2 and from the force of the compression spring 9—in each case with due consideration of the transmission ratio prevailing at the time.

The difference in amount between curves A and B represents the excess force which is present for mass acceleration or for safety reasons.

FIG. 3 illustrates the kinematics of the piston stroke and the corresponding armature path, three intermediate positions being shown in each case. It is seen that in the reloading phase—corresponding to curve B in FIG. 4—an initially large piston stroke produces a small change in pressure and, finally, a large increase in pressure results from a small change in stroke. It follows from this that a non-linear variation of the force is established on the pressure relief piston.

In each case, only the minimum necessary reloading force acts on the pressure relief piston since the electromagnet, whose characteristic curve is fundamentally larger in amount than the spring characteristic curve, consumes the excess force present.

In the foregoing, the terms "upward" and "downward" and the like refer to directions as seen in the Figures. No limitation as to permissible orientations of the pressure modulator is intended.

Although an illustrative embodiment of the invention has been described herein, the invention is not limited by such embodiment. Rather, the invention includes many modifications and variations of the preceding that may occur to one skilled in the art.

What is claimed is:

1. A pressure modulator for an anti-locking brake system, comprising:
   inlet means for receiving hydraulic fluid pressure from an operator-actuated hydraulic pressure generator;
   outlet means for transmitting hydraulic fluid pressure to a brake;
   control means for communicating hydraulic pressure between the inlet means and the outlet means, the control means including an expandable chamber having a valve for controlling fluid flow between the chamber and the inlet means, the chamber being partially defined by a movable section thereof, and the outlet means communicating with the chamber independently of the valve;
   first biasing means urging the valve in a second direction;
   second biasing means urging said movable section in a first direction to reduce the volume of said chamber, said movable section engaging the valve, and said second biasing means thereby biasing the valve in said first direction opposite to said second direction;
   actuating means for selectively exerting an actuating force substantially transverse to said first and second directions for opposing said second biasing means and thereby moving said movable section in said second direction to increase the volume of said chamber; and
   transmission means including lever means for transmitting forces between said actuating means, said movable section, and said second biasing means, said lever means providing a transmission ratio which varies as a function of the movement of said movable section.

2. A pressure modulator as in claim 1, wherein said lever means interconnects said movable section and said actuating means, the force of said second biasing means being exerted toward said lever means and on a portion of said actuating means remote from the lever means.

3. A pressure modulator as in claim 2, wherein the lever means includes first and second tappets respectively engaging the movable section and the actuating means, and a lever having first and second connecting portions which are pivotally connected to said first and second tappets, said lever being pivotally mounted in the pressure modulator so as to be pivoted oppositely by forces exerted by the first and second tappets.

4. A pressure modulator as in claim 3, wherein said tappets are pivotally mounted to said movable section, said actuating means, and said lever by ball joints.

5. A pressure modulator as in claim 3, wherein the lever is configured and dimensioned for transmitting forces between said movable section and said actuating means with a step-down transmission ratio when the movable section is displaced relatively little in the second direction, but with a step-up transmission ratio when said movable section is displaced relatively farther in the second direction.

6. A pressure modulator as in claim 1, wherein said second biasing means comprises a compression spring.

7. A pressure modulator as in claim 1, wherein the first and second biasing means exert respective selected biasing forces on said valve, such that said valve will close when the hydraulic pressure received by said inlet means corresponds to a locking pressure of said brake system.

8. A pressure modulator as in claim 3, wherein the actuating means comprises drive means for driving said first connecting portion of said lever in said second direction.

9. A pressure modulator for an anti-locking brake system, comprising:
   inlet means for receiving hydraulic fluid pressure from an operator-actuated hydraulic pressure generator;
   outlet means for transmitting hydraulic fluid pressure to a brake;
   control means for communicating hydraulic pressure between the inlet means and the outlet means, the control means including an expandable chamber having a valve for controlling fluid flow between the chamber and the inlet means, the chamber being partially defined by a movable section thereof, and the outlet means communicating with the chamber independently of the valve;
   first biasing means urging the valve in a closing direction;
   second biasing means urging said movable section in a first direction to reduce the volume of said chamber, said movable section engaging the valve, and said second biasing means thereby biasing the valve in an opening direction opposite to said closing direction;
   actuating means for selectively exerting an actuating force for opposing said second biasing means and thereby moving said movable section in a second direction to increase the volume of said chamber; and
   transmission means including lever means for transmitting forces between said actuating means, said movable section, and said second biasing means, said lever means providing a transmission ratio which varies as a function of the movement of said movable section;
   wherein said lever means interconnects said movable section of said chamber, and said actuating means, the force of said second biasing means being exerted toward said lever means and on a portion of said actuating means remote from the lever means; wherein the lever means includes first and second tappets respectively engaging the movable section of said chamber and the actuating means, and a lever having first and second connecting portions which are pivotally connected to said first and second tappets, said lever being pivotally mounted in the pressure modulator so as to be pivoted oppositely by forces exerted by the first and second tappets;

wherein the actuating means comprises drive means for driving said first connecting portion of said lever in said second direction; and wherein the drive means comprises an armature which interconnects said second biasing means and said second connecting portion of said lever, and an electromagnet for selectively exerting a variable force on the armature in a direction against the force of the second biasing means.

* * * * *